US011332300B2

(12) United States Patent
Stenghel et al.

(10) Patent No.: US 11,332,300 B2
(45) Date of Patent: May 17, 2022

(54) ACTUATOR CAP FOR A FLUID SPRAY DISPENSER

(71) Applicant: Coster Tecnologie Speciali S.p.A., Calceranica al Lago (IT)

(72) Inventors: Valentino Stenghel, Trento (IT); Adalberto Geier, Villazzano/Trento (IT)

(73) Assignee: Coster Tecnologie Speciali S.p.A., Calceranica al Lago (IT)

( * ) Notice: Subject to any disclaimer, the term of this patent is extended or adjusted under 35 U.S.C. 154(b) by 0 days.

(21) Appl. No.: 16/633,758

(22) PCT Filed: Jan. 9, 2018

(86) PCT No.: PCT/EP2018/050441
§ 371 (c)(1),
(2) Date: Jan. 24, 2020

(87) PCT Pub. No.: WO2019/020218
PCT Pub. Date: Jan. 31, 2019

(65) Prior Publication Data
US 2021/0155397 A1 May 27, 2021

(30) Foreign Application Priority Data

Jul. 28, 2017 (EP) .................................... 17183785

(51) Int. Cl.
*B65D 83/20* (2006.01)
*B65D 83/22* (2006.01)
(Continued)

(52) U.S. Cl.
CPC ........... *B65D 83/206* (2013.01); *B65D 83/22* (2013.01); *B05B 11/3057* (2013.01);
(Continued)

(58) Field of Classification Search
CPC ...... B65D 83/206; B65D 83/22; B65D 83/56; B65D 83/205; B05B 11/3057;
(Continued)

(56) References Cited

U.S. PATENT DOCUMENTS

| 4,542,837 A | 9/1985 | Rayner |
| 5,378,422 A | 1/1995 | Musiel et al. |

(Continued)

FOREIGN PATENT DOCUMENTS

| DE | 296 10 372 U1 | 10/1996 |
| DE | 10 2010 011761 A1 | 9/2011 |

(Continued)

OTHER PUBLICATIONS

International Search Report and Written Opinion for Application No. PCT/EP2018/050441, dated Mar. 27, 2018.

*Primary Examiner* — Frederick C Nicolas
(74) *Attorney, Agent, or Firm* — Marshall, Gerstein & Borun LLP

(57) ABSTRACT

An actuator cap (1; 50) for a fluid spray dispenser comprises a second body part (2) and a first body part (3). The first body part (3) is adapted for connection to a container for the fluid to be dispensed and incorporates a spray channel arrangement (4). The second body part (2) incorporates an actuator button (5) and is rotatable with respect to the first body part (3) from a first position in which the actuator button (5) is non-elevated into a second position in which the actuator button (5) is elevated and capable of depression to cause depression of a part (16) of the spray channel arrangement (4). The actuator button (4) defines a first cam profile (20) along which a first cam follower (22) defined by the first body part (3) travels to cause elevation or retraction of the actuator button (5) when the second body part (3) is rotated. The actuator button (5) also defines a second cam profile (23) that bears against said part (21) of the spray channel (Continued)

arrangement (4) such that when the actuator button (5) is in its elevated position and depressed the actuator button (5) depresses the second cam profile (23) and in turn depresses the part (21) of the spray channel arrangement (4) relative to the first body part (3) to dispense fluid from the container when in use. Preferably, the first and second body parts (3, 2) are individual, integrally moulded components that are snap-fitted together to assemble the actuator cap (1; 50).

26 Claims, 13 Drawing Sheets

(51) Int. Cl.
| | | |
|---|---|---|
| B05B 11/00 | (2006.01) | |
| B29C 45/00 | (2006.01) | |
| B29C 45/16 | (2006.01) | |
| B29C 49/06 | (2006.01) | |
| B65D 83/56 | (2006.01) | |

(52) U.S. Cl.
CPC ......... *B05B 11/3059* (2013.01); *B29C 45/006* (2013.01); *B29C 45/1657* (2013.01); *B29C 49/06* (2013.01); *B65D 83/205* (2013.01); *B65D 83/56* (2013.01)

(58) Field of Classification Search
CPC ............... B05B 11/3059; B29C 45/006; B29C 45/1657; B29C 49/06
See application file for complete search history.

(56) References Cited

U.S. PATENT DOCUMENTS

| | | | | |
|---|---|---|---|---|
| 5,649,645 | A * | 7/1997 | Demarest | B65D 83/205 222/153.07 |
| 7,121,434 | B1 * | 10/2006 | Caruso | B65D 83/206 222/402.13 |
| 7,854,350 | B2 * | 12/2010 | Lasserre | B65D 83/68 222/137 |
| 2008/0041889 | A1 * | 2/2008 | Geier | B65D 83/205 222/402.11 |
| 2011/0108583 | A1 * | 5/2011 | Sell | B65D 83/206 222/402.13 |
| 2013/0075429 | A1 * | 3/2013 | Houser | B65D 83/22 222/153.11 |

FOREIGN PATENT DOCUMENTS

| | | | |
|---|---|---|---|
| DE | 10 2010 034856 A1 | 2/2012 | |
| EP | 1 749 759 A1 | 2/2007 | |
| EP | 2 481 484 A1 | 8/2012 | |
| FR | 2 900 645 A1 | 11/2007 | |
| JP | S6287765 U * | 6/1987 | ........... B65D 83/206 |
| WO | WO-2009/016352 A2 | 2/2009 | |
| WO | WO-2012/101372 A1 | 8/2012 | |
| WO | WO-2013/068189 A1 | 5/2013 | |
| WO | WO-2013/132357 A1 | 9/2013 | |

* cited by examiner

ACTUATOR CAP FOR A FLUID SPRAY DISPENSER

The present invention relates to an actuator cap for a fluid spray dispenser that allows the contents of a container to which the actuator cap is fitted to be sprayed without any part of the cap having to be removed.

In the following description and the claims, orientation terms such as "horizontal", "vertical", "upper" and "lower" refer to the actuator cap of the invention when oriented in an upright manner as it would be when connected to a an upright fluid container, such as an aerosol can, with which it is designed for use. Similarly, use of the term "open" refers to a condition when an actuator button of the actuator cap is elevated and the cap is ready to dispense and the term "closed" refers to a condition when the actuator cap is not elevated and cannot be used to dispense the product.

BACKGROUND

A conventional actuator cap for a fluid spray dispenser as aforesaid comprises a rotatable outer body with an associated actuator button and a non-rotatable inner body with an associated spray channel assembly. The outer body and actuator button are rotatable relative to the inner body from a first position in which the actuator button is non-elevated and incapable of depression into a second position in which the actuator button is elevated and capable of depression to cause depression of the spray channel assembly. This, in turn, causes release of a liquid product from an associated container through the spray channel assembly. Such an arrangement is described in U.S. Pat. No. 4,542,837.

A more complex arrangement is described in WO2013/068189. Here there is an intermediate position of the actuator cap wherein the actuator button is elevated across its full length and width relative to a top surface of the outer body but is still incapable of depression.

In both arrangements, drive ramps or cam surfaces are used to elevate the actuator button and formed on a lower component of the cap, either in conjunction with a spray channel assembly or a skirt secured to the container.

One reason for actuator caps to be made so that they only operate when an actuator button is elevated is to make the actuator child-resistant. However, such actuator caps comprise several parts that clip together, each being a relatively complex moulded product. They are therefore expensive to manufacture, which adds to the cost of the finished article. As the liquid products it is usually desired to sell using in dispensers incorporating actuator caps of this kind are usually commonly used household and cosmetic products such as deodorants and the like, the cost of the finished article is of particular concern as often the cost of the dispenser can be disproportionate relative to the cost of the product to be dispensed.

An object of the present invention is to therefore to provide an actuator cap for a fluid spray dispenser that addresses these issues by reducing the number of components of the cap and simplifying their construction. This enables the components of the actuator cup to be manufactured economically and efficiently, thereby significantly reducing the cost of the finished product.

SUMMARY

According to the present invention there is provided an actuator cap for a fluid spray dispenser comprising a first body part adapted for connection to a container for a fluid to be dispensed and incorporating a spray channel arrangement; and a second body part incorporating an actuator button, the second body part being rotatable with respect to the first body part from a first position in which the actuator button is non-elevated into a second position in which the actuator button is elevated and capable of depression to cause depression of a part of the spray channel arrangement;

characterised in that the actuator button defines a first cam profile along which a first cam follower defined by the first body part travels to cause elevation or retraction of the actuator button when the second body part is rotated; and the actuator button defines a second cam profile that bears against said part of the spray channel arrangement such that when the actuator button is in its elevated position and depressed the actuator button depresses said second cam profile and in turn depresses said part of the spray channel arrangement relative to the first body part to dispense the fluid from the container when in use.

Other preferred additional features of the various aspects of the present invention are described in the dependent claims appended hereto.

DETAILED DESCRIPTION

The drawings and following description relate to first and second embodiments of the present invention, 1 and 50 respectively, by way of example only and identical components of each or components of each with an identical function have been given the same reference numbers.

Figure 20:
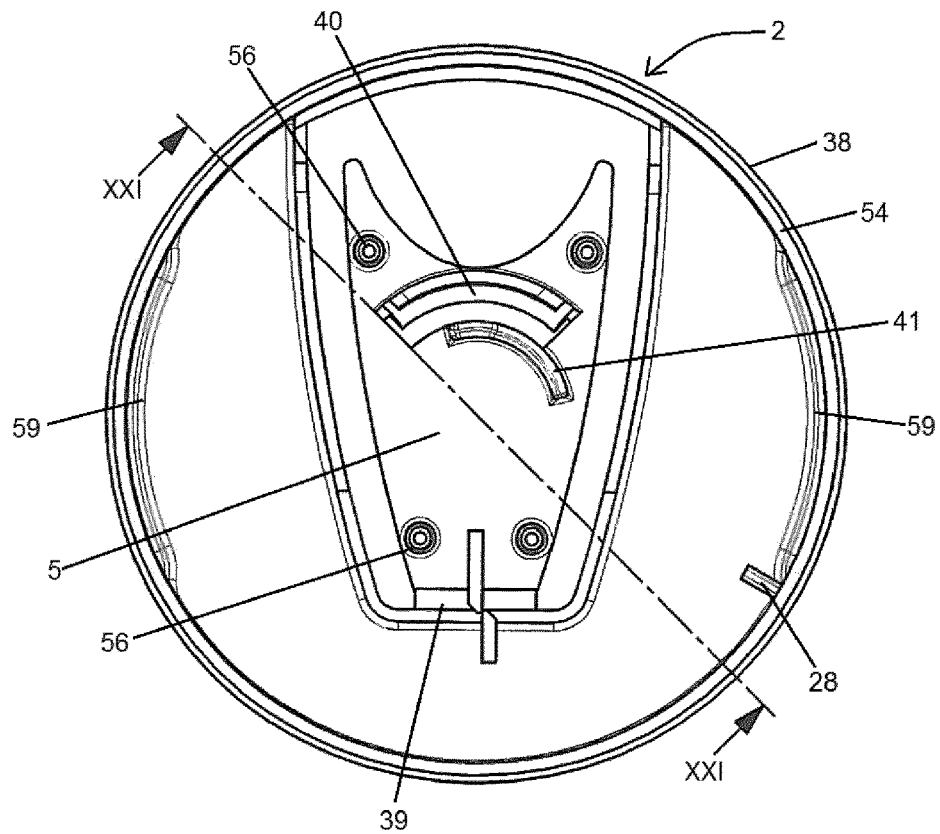
FIG. 20 is a view from below of the second body part only of the actuator cap shown in FIGS. 15 to 19.
Figure 21:
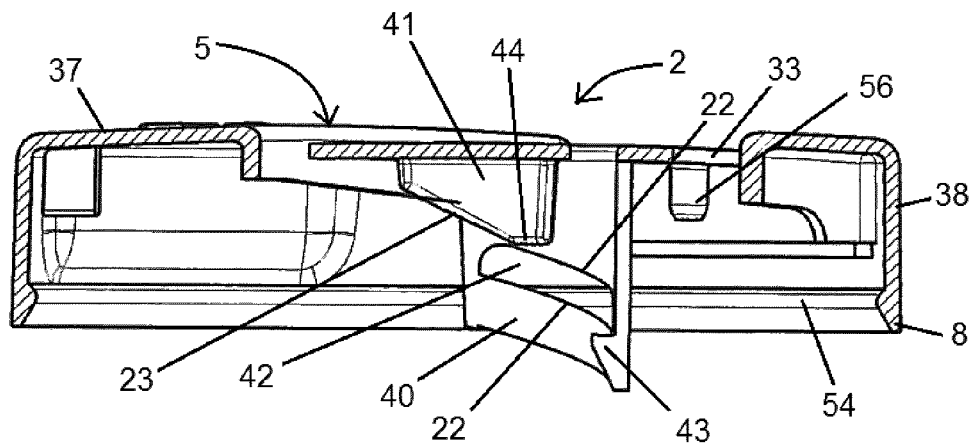
FIG. 21 is a sectional view along the line XXI-XXI in FIG. 20.
Figure 22:
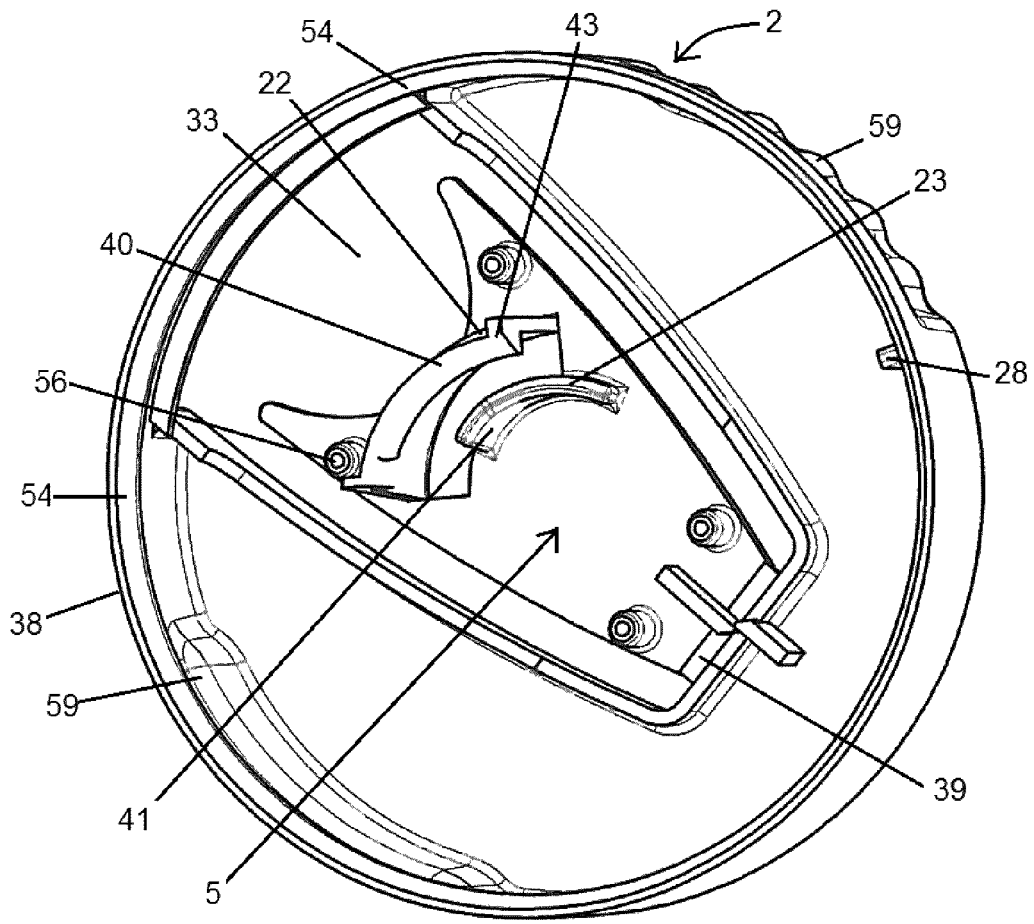
FIG. 22 is a perspective view from below of the second body part shown in FIG. 20.
Figure 23:
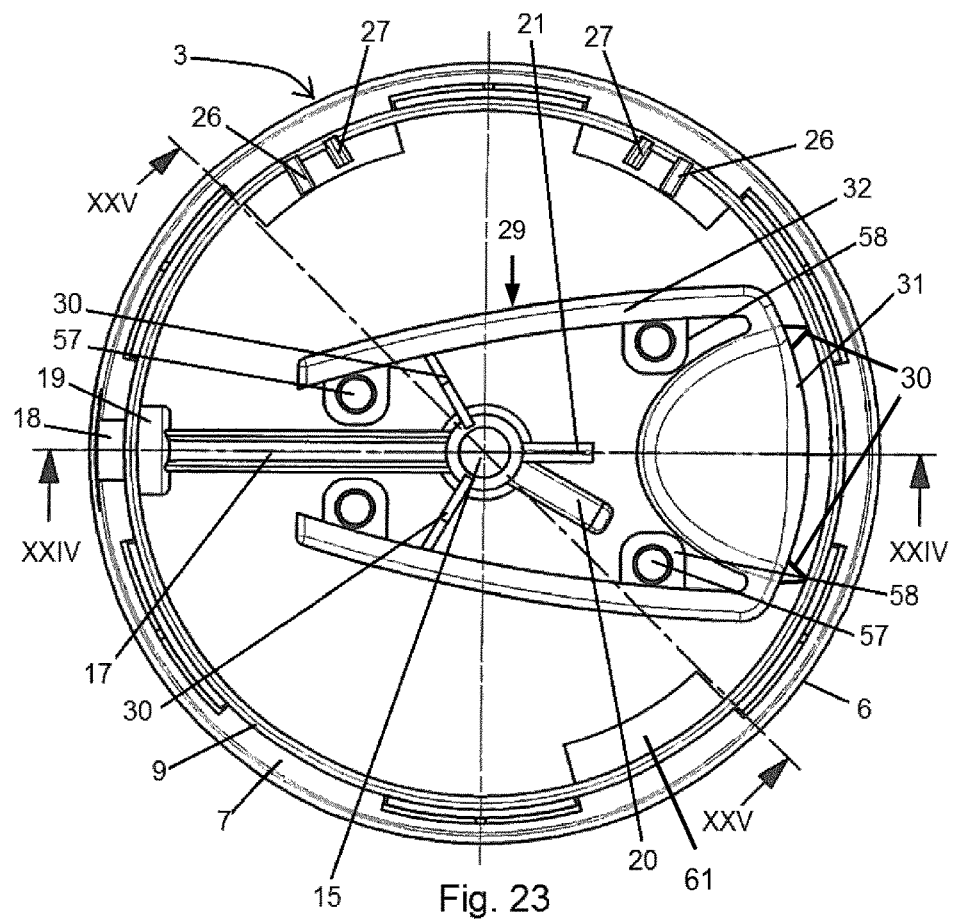
FIG. 23 is a plan view of the first body part of the actuator cap shown in FIGS. 15 to 19.
Figure 24:
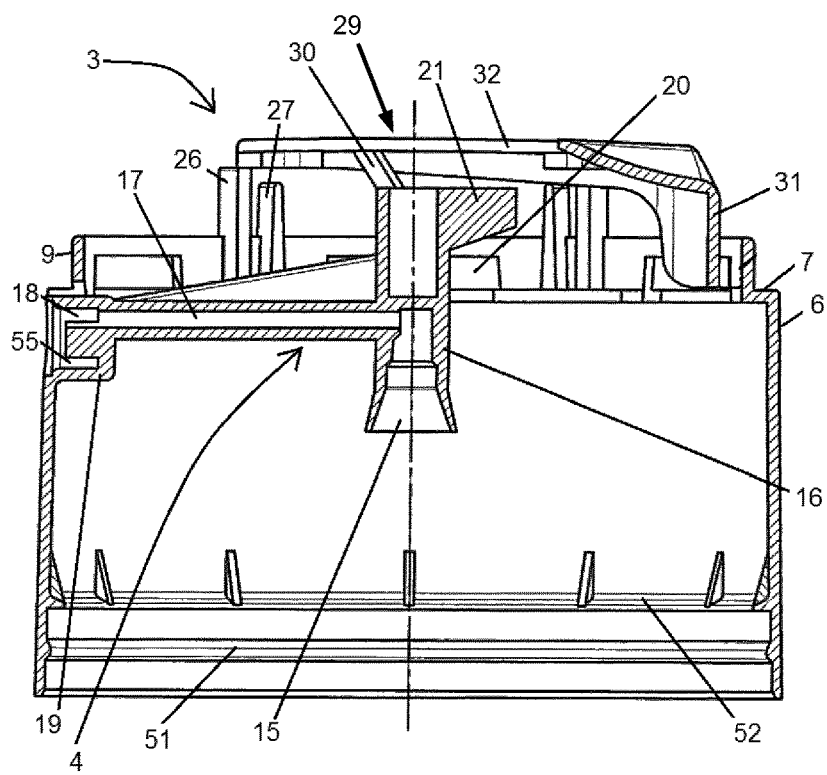
FIG. 24 is a sectional view along the line XXIV-XXIV in FIG. 23.
Figure 25:
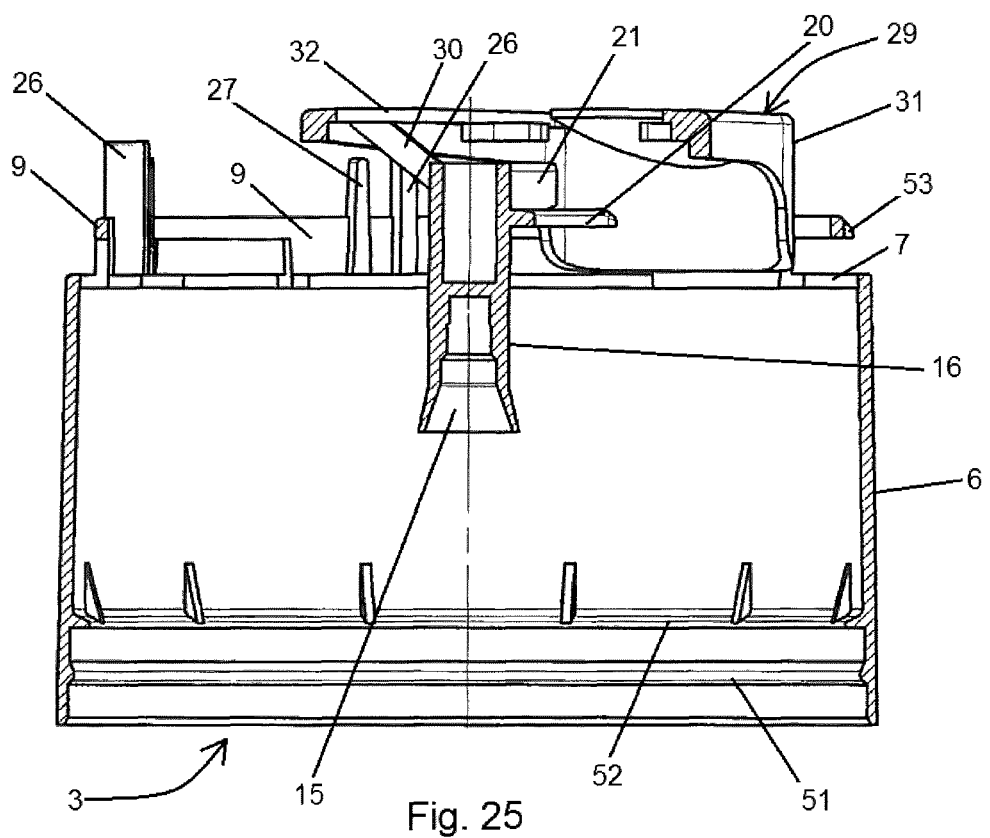
FIG. 25 is a sectional view along the line kW-kW in FIG. 23.

The actuator cap 1, 50 of the present invention is assembled from two parts. In the first embodiment, as shown in FIGS. 1 to 6, these parts comprise a first body part 3 that is an inner body part and a second body part 2 that is an outer body part. The second body part 2 is shown solus in FIGS. 7 and 8, and the first body part 3 is shown solus in FIGS. 9 to 14. In contrast, in the second embodiment of the present invention, as shown in FIGS. 15 to 19, the first body part 3 is a lower body part and the second body part 2 is a cap that is fitted to an over the top of the first body part 3. The second body part 2 is shown solus in FIGS. 20 to 22 and the first body part 3 is shown solus in FIGS. 23 to 25.

Figure 2:
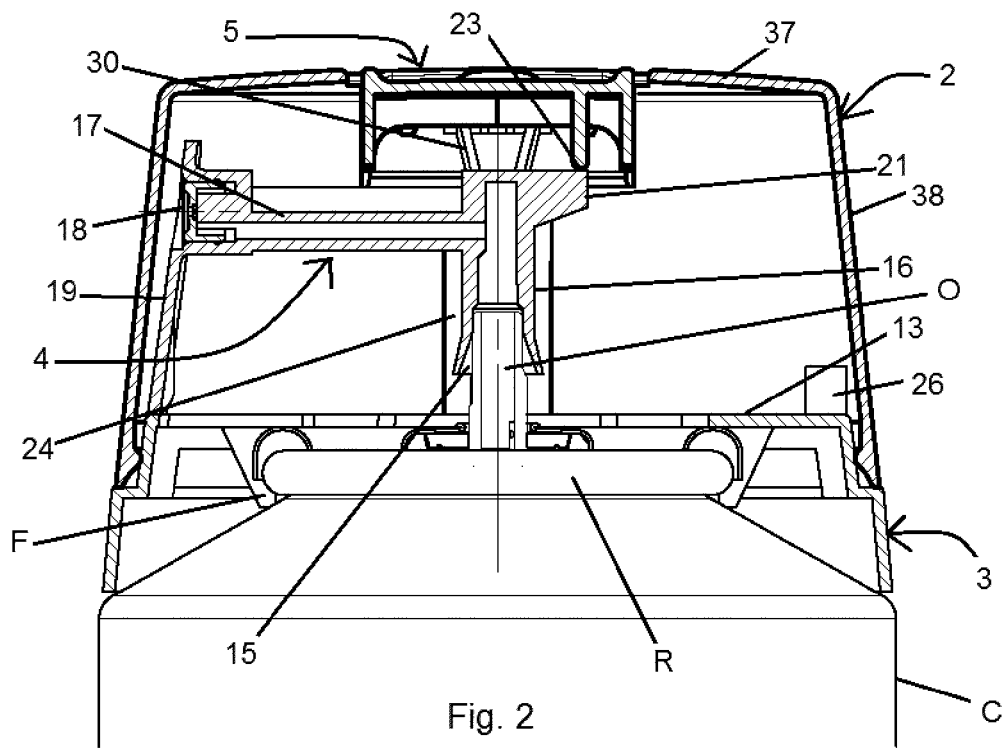
FIG. 2 is a sectional view along the line II-II in FIG. 1 and also showing, in part, a container with a valve outlet secured to the actuator cap.
Figure 1:
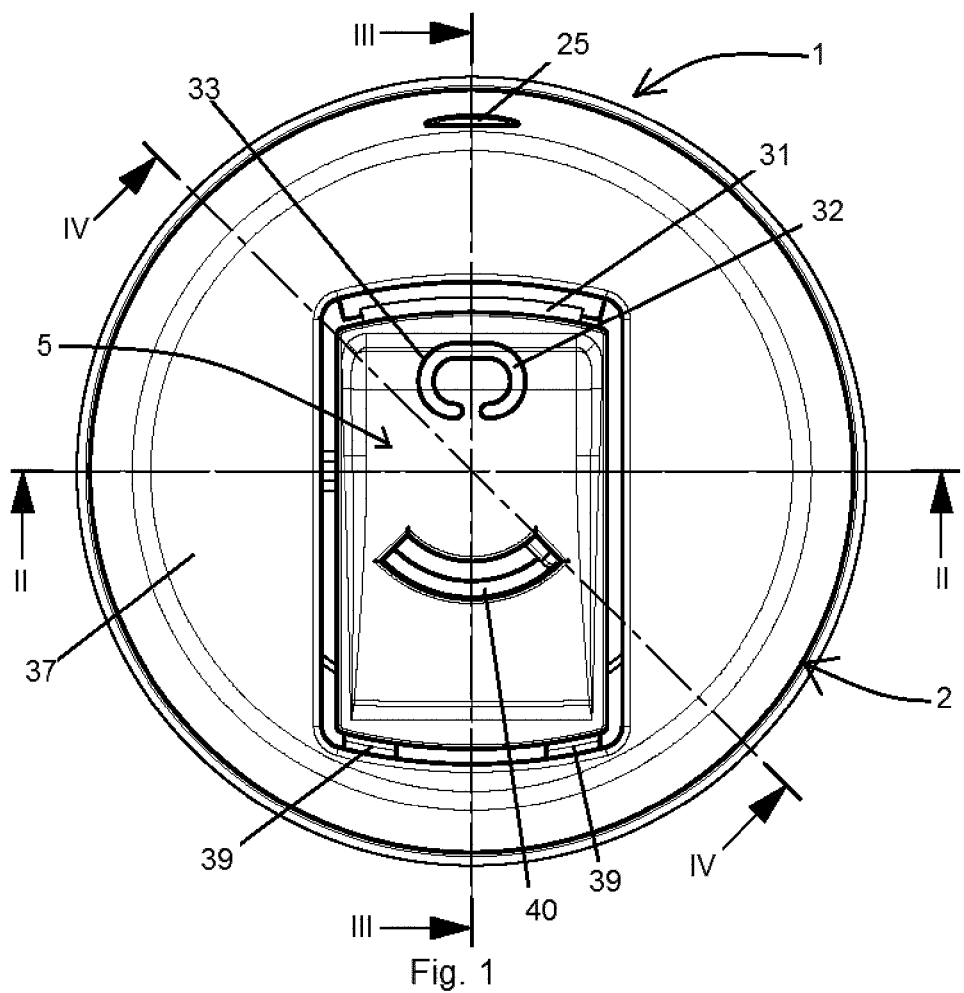
FIG. 1 is a plan view of a first embodiment of actuator cap for a fluid spray dispenser in accordance with the present invention when in a closed condition.
Figure 3:
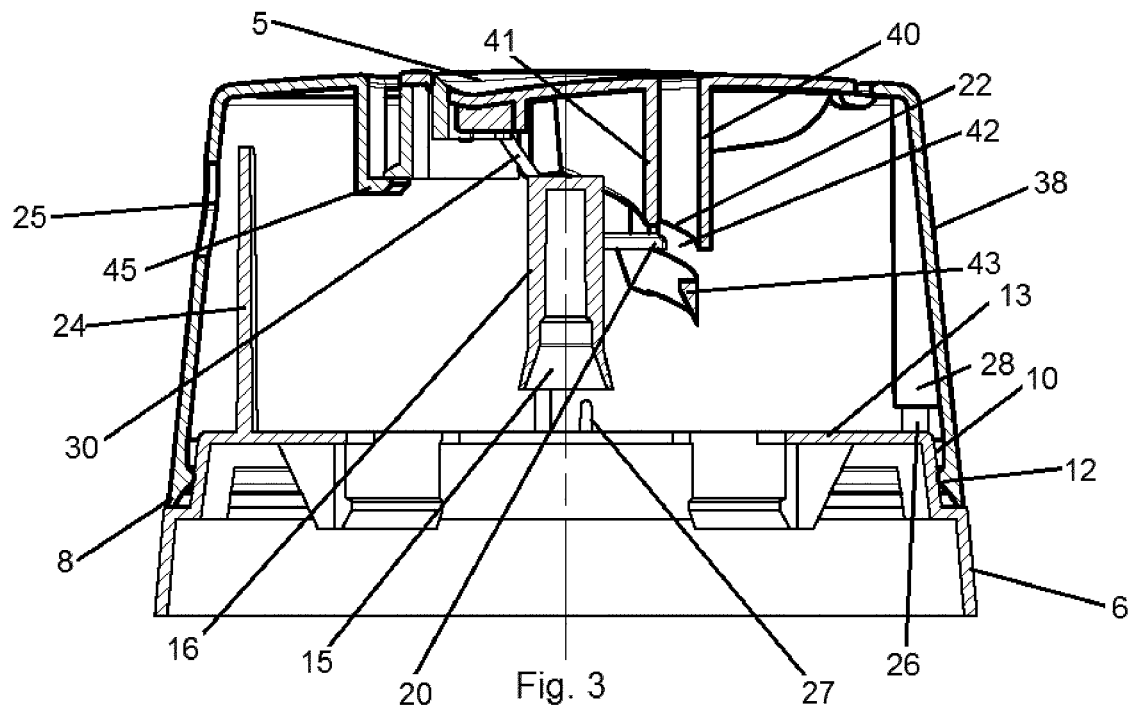
FIG. 3 is a sectional view along the line III-III in FIG. 1.
Figure 4:
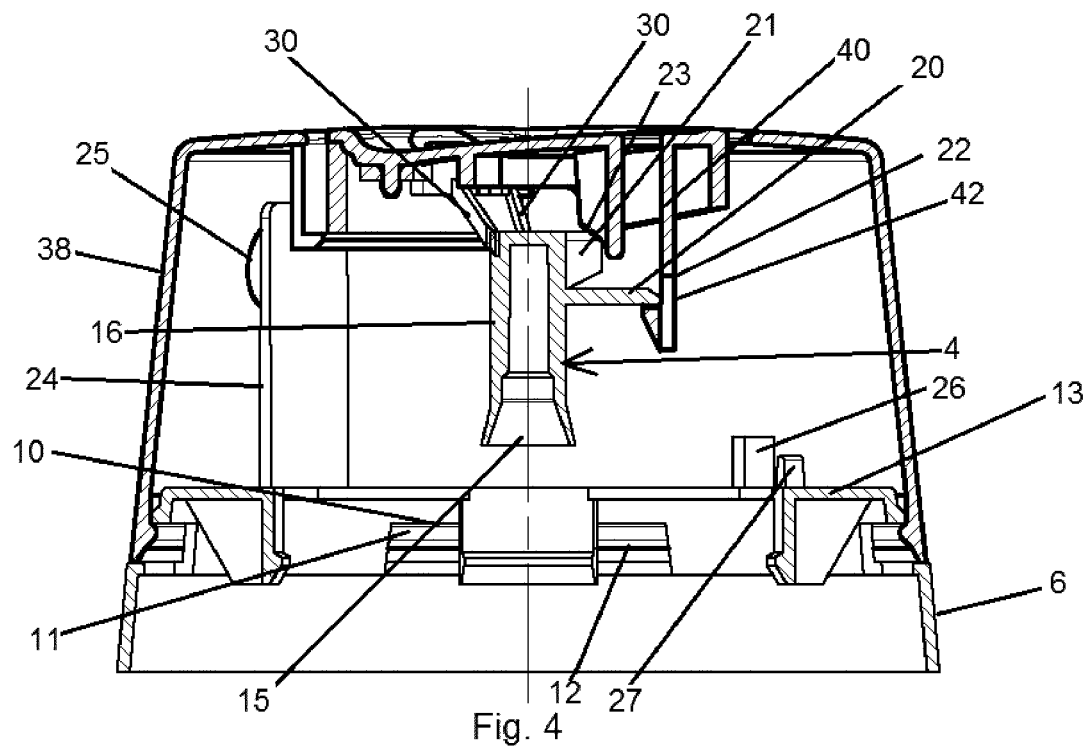
FIG. 4 is a sectional view along the line IV-IV in FIG. 1.
Figure 5:
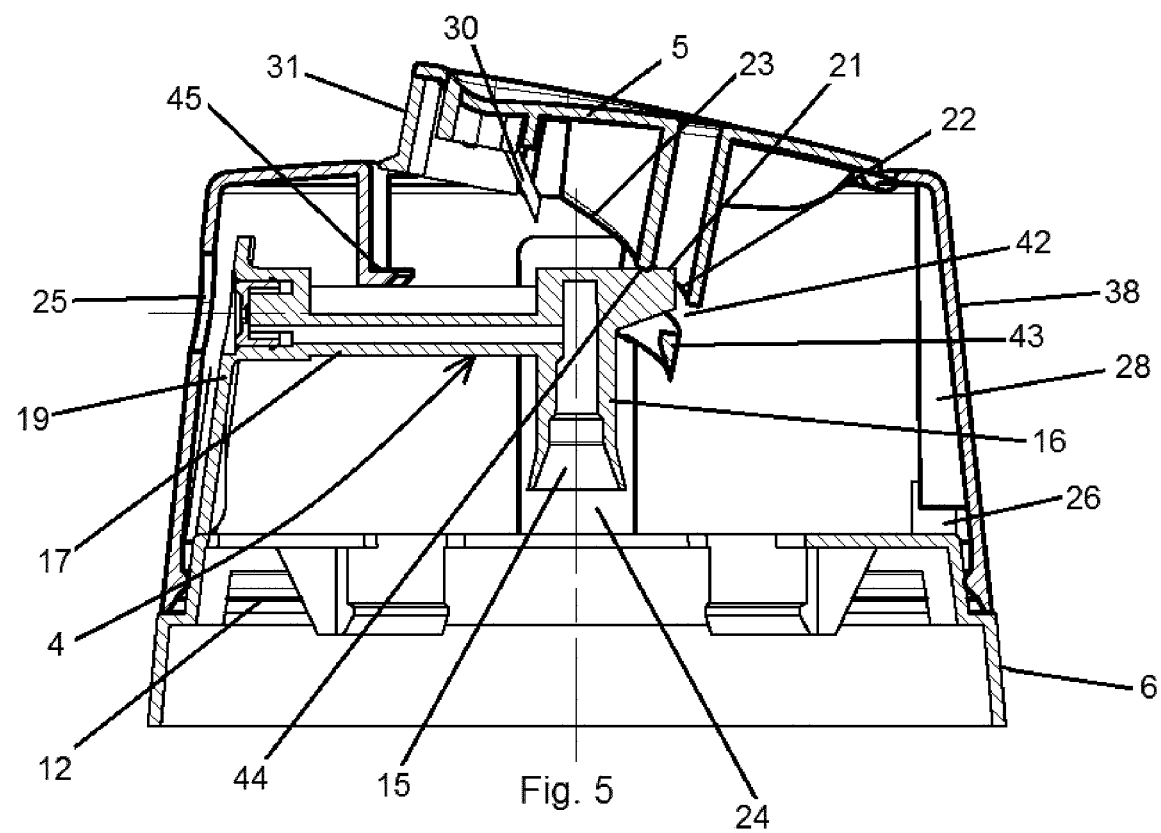
FIG. 5 is a sectional view similar to FIG. 2 but showing the actuator cap only with an second body part thereof rotated with respect to an first body part when the actuator cap is open.
Figure 6:
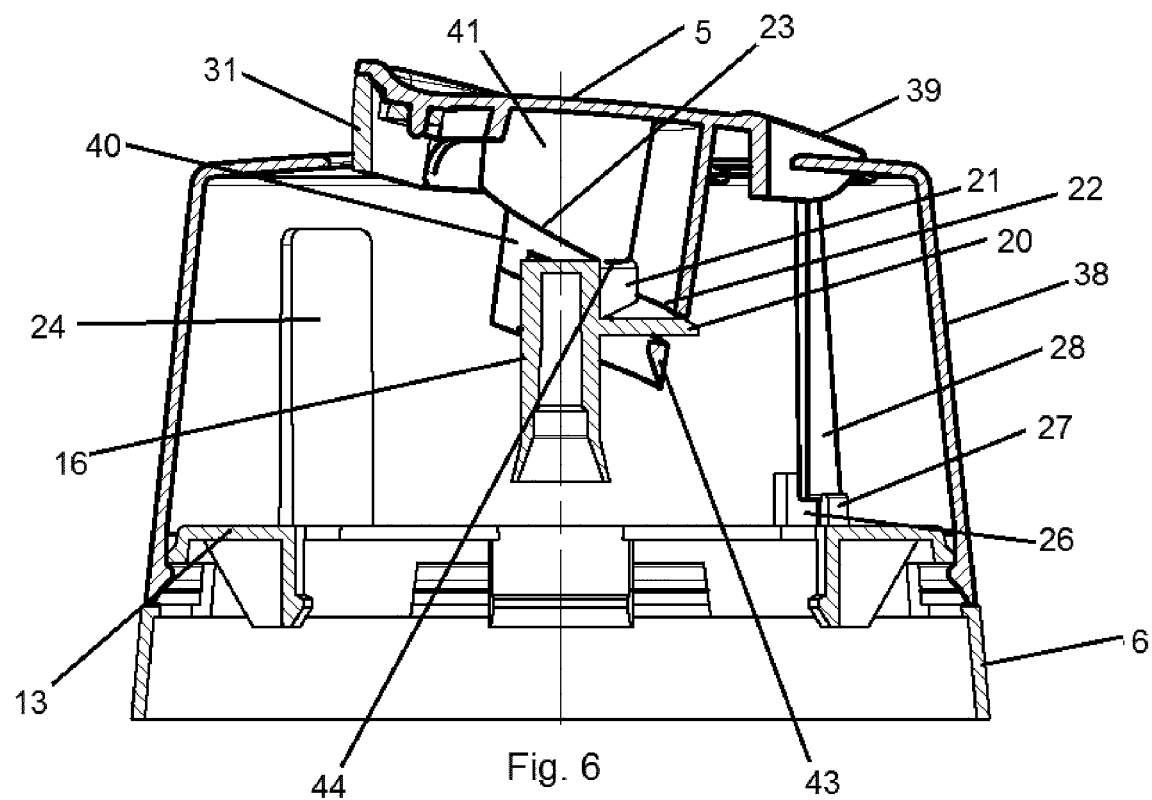
FIG. 6 is a sectional view similar to FIG. 4 but also showing the second body part rotated with respect to the first body part and the actuator cap open.
Figure 7:
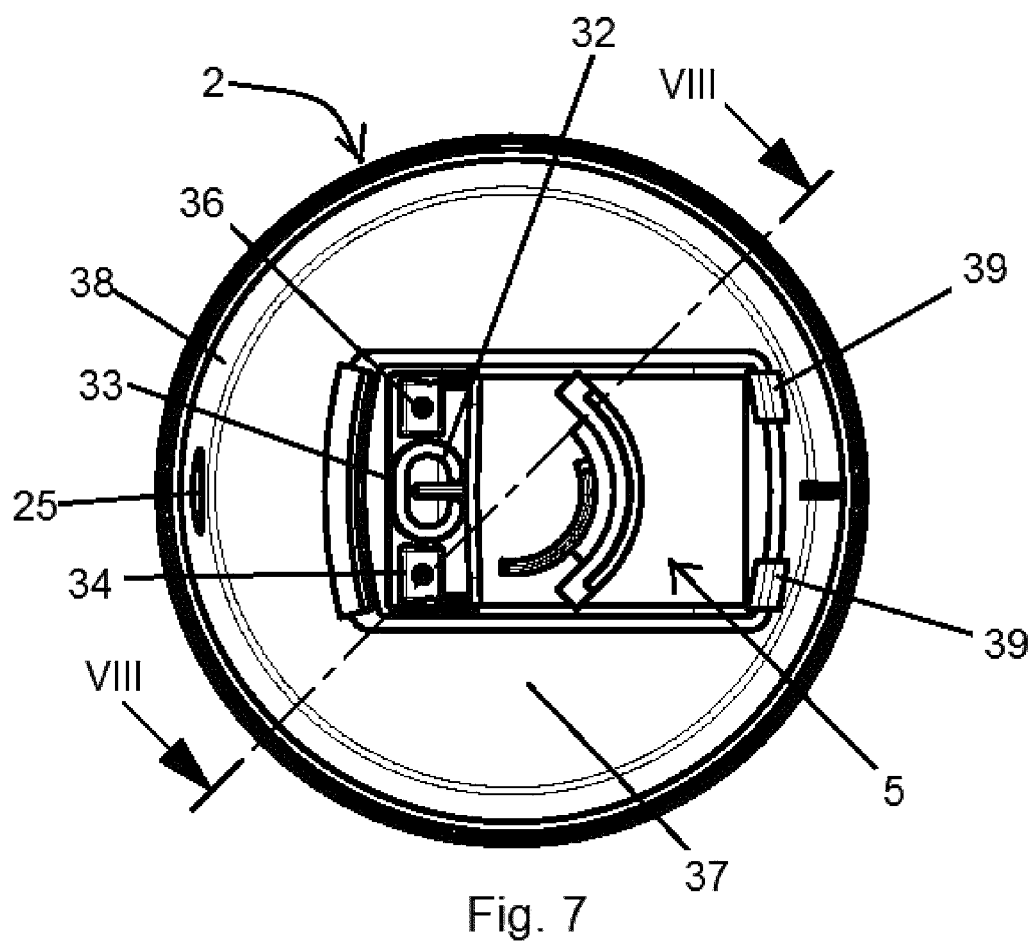
FIG. 7 is a view from below of the second body part of the actuator cap.
Figure 16:
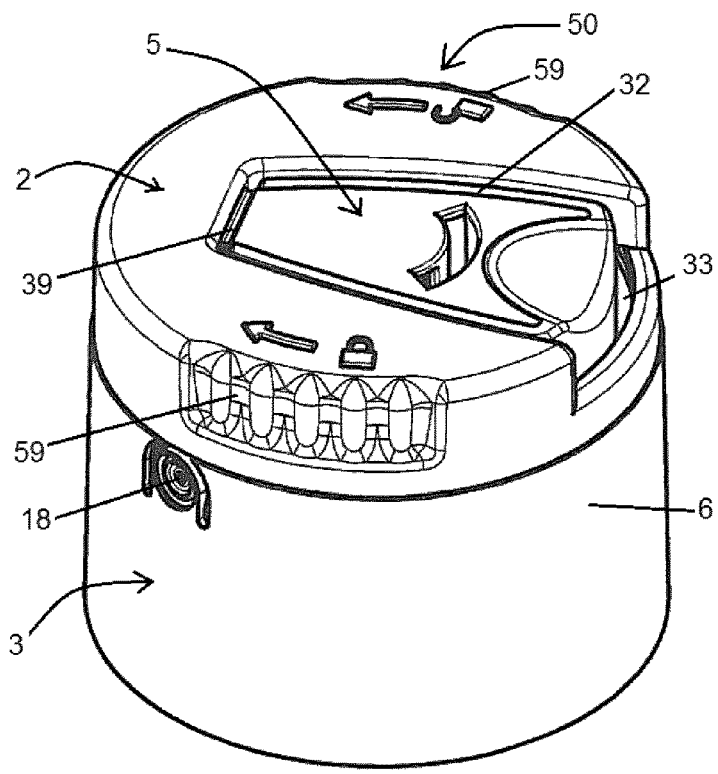
FIG. 16 is a perspective view of the actuator cap shown in FIG. 15.
Figure 17:
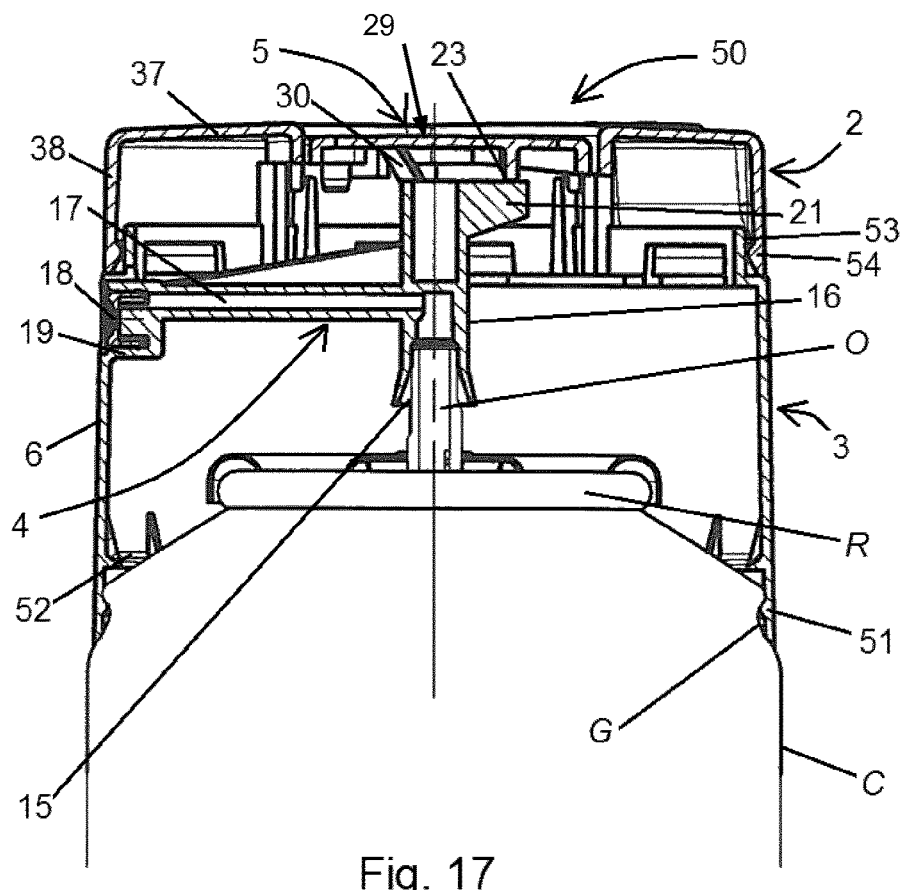
FIG. 17 is a sectional view along the line XVII-XVII in FIG. 15 and also showing, in part, a container with a valve outlet secured to the actuator cap.
Figure 18:
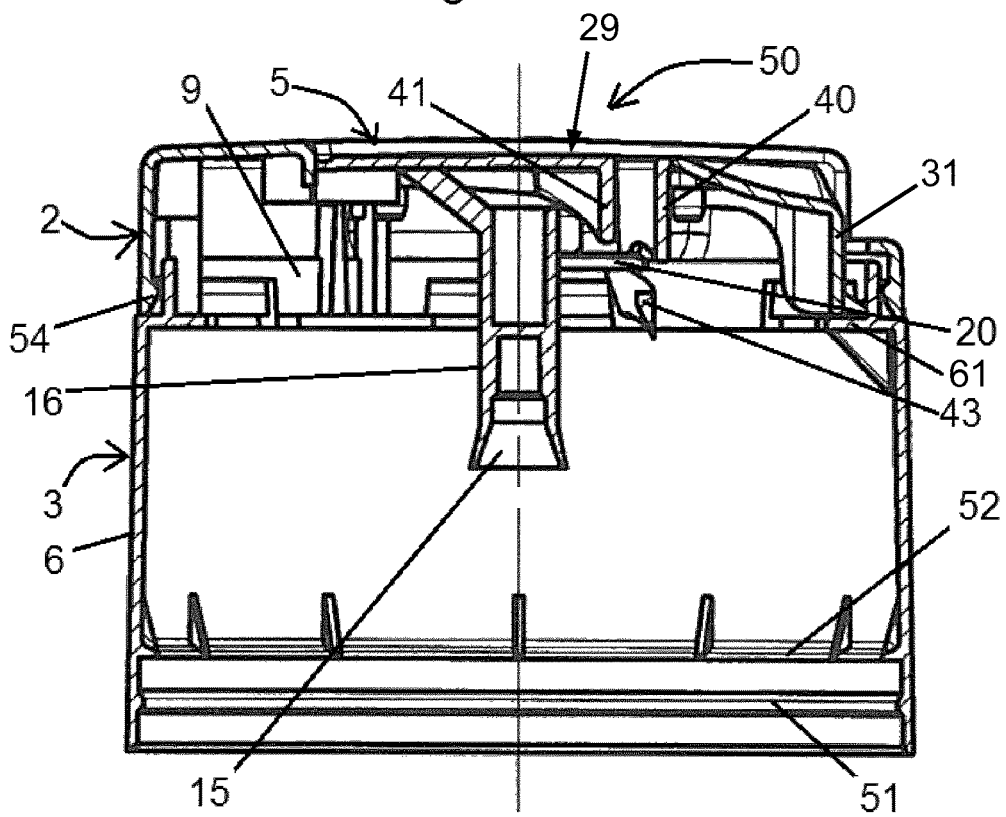
FIG. 18 is a sectional view along the line XVIII-XVIII in FIG. 15.
Figure 19:
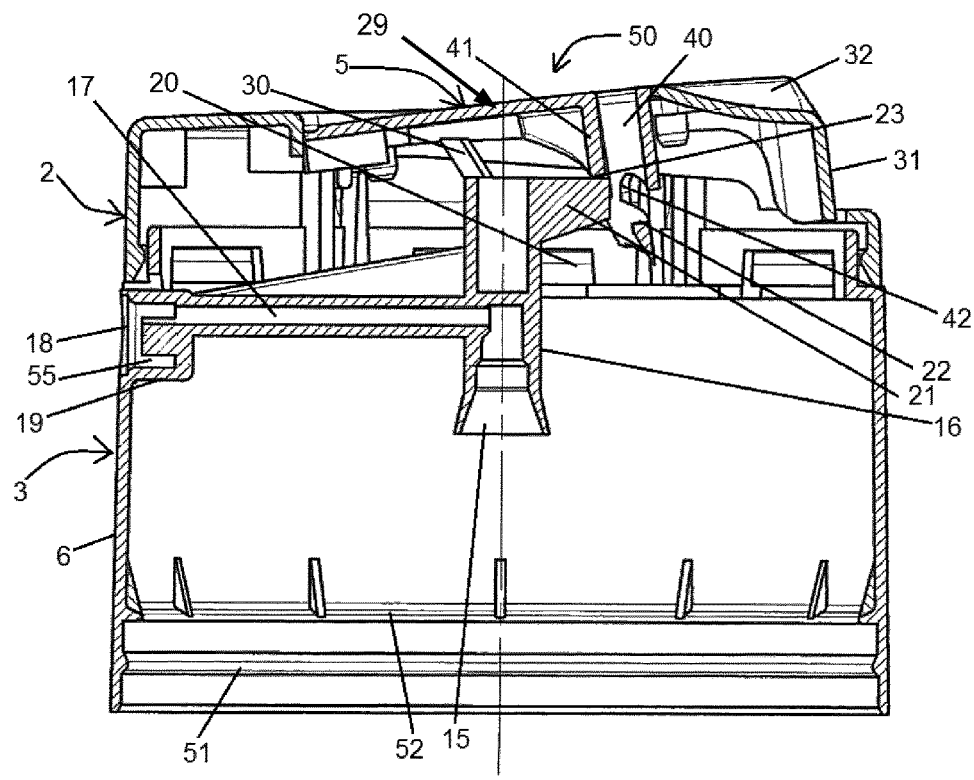
FIG. 19 is a sectional view similar to FIG. 17 but showing the actuator cap only and when open with a second body part thereof rotated with respect to a first body part thereof.

With reference in particular to FIGS. 2 and 17, the first body part 3 is adapted for connection to a rim R of a container C for a fluid to be dispensed, such as an aerosol can, and incorporates a spray channel arrangement 4. The second body part 2 incorporates an actuator button 5. When assembled, the second body part 2 is rotatably mounted over the first body part 3 and rotates from a first position, in which the actuator button 5 is non-elevated and the cap 1 is closed as shown in FIGS. 1 to 4 and in FIGS. 15 to 18, to a second position, in which the actuator button is elevated and capable of depression to cause depression of the spray channel arrangement 4, as shown in FIGS. 5 and 6 and in FIG. 19. The construction and workings of the two embodiments of actuator cap 1 are described in more detail below and it will become apparent that the actuator cap 1 is capable of being assembled from just two moulded plastics parts, namely the first and second body parts 3, 2 unlike conventional caps, which require several individual components to be assembled to form a cap including separate inner and outer parts, an actuator button and a spray channel arrangement, which may itself be an assembly of separate parts.

In order to make the actuator cap 1, 50 of the present invention attractive and eye-catching, the first and second body parts 3 and 2 are preferably moulded from plastics materials, such as polypropylene, that have been respectively dyed in two different colours, preferably contrasting colours. In this way the first body part 3 provides an eye-catching contrast to the second body part 2 dependent on the colours chosen.

The first embodiment actuator cap 1, as shown in FIGS. 1 to 14, will now be described in more detail.

The first body part 3 of the actuator cap 1 is adapted to be secured to the dispenser, such as the pressurized fluid container C, by the provision of an annular skirt 6 that is or can be adapted as appropriate to fit over the rim R of an upper opening of C Above the skirt 6, the body 3 steps inwards to defines a substantially horizontal shoulder 7 on which a lower edge 8 of the second body part 2 sits after assembly of the actuator cap 1. Hence, the outer peripheral surface of the skirt is always visible in the assembled cap 1. Adjoining the shoulder is an annular upstand 9 defining a plurality of spaced flanges 10 adjacent slots 11. The flanges 10 are adapted to snap-fit over an annular flange 12 formed around the inner periphery of the second body part 2 adjacent its lower edge 8 with the slots 11 providing a degree of give to permit this to take place. In this way, the upper body 2 can be snap-fitted over the first body part 3 to assemble the actuator cap 1 yet still permit the upper body 2 to be rotated relative to the first body part 3.

Adjoining the upper edge of the upstand 9 is a substantially annular platform 13 that defines a central aperture 14. The aperture 14 may also be provided with a peripheral shape and flanges with clips F (see FIG. 2) or similar that enables it to be appropriately secured to the container C It will be appreciated that the flanges, clips and the shape of the aperture 14 may vary dependent on the design of the container C In use, when the actuator cap 1 is secured to the container C, the outlet O of a spring-loaded valve (not shown), through which the fluid to be dispensed from the container C passes, projects through the aperture 14 and makes fluid contact with an inlet 15 to the spray channel arrangement 4, which may be flared outwards to accommodate it, as shown in FIG. 2. The spray channel arrangement 4 comprises two integrally formed channels 16 and 17 that are in fluid communication with one another and that are arranged at right angles, one channel 16 being vertical and the other channel 17 being horizontal. The inlet 15 is formed at the lower end of the vertical channel 16, which is centrally located so that its longitudinal axis coincides with that of the actuator cap 1 and the valve outlet O. A fluid outlet 18 from the spray channel arrangement 4 is defined at one end of the horizontal channel 17 through an upright resilient element 19 on which the spray channel arrangement is integrally mounted. The element 19 is integrally formed with and projects upwards from one side of the platform 13. Hence, the spray channel arrangement 4 is a cantilever but its securement to the resilient element 19 enables the vertical channel 16 to be depressed against the bias of the resilient element 19, tilting the channel 17 slightly out of the horizontal. In use, as is described in more detail below, this enables the flared inlet 15 to press down on the outlet O of the valve against the bias of its spring-loading so that the valve opens to allow fluid to be dispensed by passing through the channels 16 and 17 and out through the outlet 18. Once pressure on the vertical channel 16 is released the resilient element 19 returns back to its original position, releasing the pressure on the spring-loaded valve thereby allowing it to close.

Projecting from the spray channel arrangement 4 adjacent the vertical channel 16 are two projections that form first and second cam followers 20 and 21. These cam followers 20, 21 travel along first and second cam profiles 22 and 23 defined by the actuator button 5, as is described in more detail below. The second cam follower 21 projects outwards from the vertical channel 16 on an opposite side of the vertical channel 16 to the horizontal channel 17 and is substantially in line with the horizontal channel 17. In use, the second cam follower 21 forms a lever that when depressed also depresses the vertical channel 16 and tilts the horizontal channel 17 slightly upwards as described above. The first cam follower 20 projects from the vertical channel 16 at an angle of around 45° to the second cam follower 21 and at a level that is lower than that of the second cam follower 20. In use, this cam follower 20 travels along its respective cam profile 22 to cause elevation or retraction of the actuator button 5 when the second body part 2 is rotated relative to the first body part 1.

The first body part 3 also comprises an upright portion 24 forming a blanking plate that covers an aperture 25 forming a fluid outlet that is defined by the second body part 2 when the actuator cap 1 is closed. The first body part 3 also comprises two pairs of projections 26, 27 that form stops against which an internal projection 28 formed on the second body part 2 abuts at the limit of its rotational travel in its first and second positions. The stops 26, 27 therefore limit further rotational movement of the second body part 2 relative to the first body part 1. In this regard, it is intended that the second body part 2 will rotate through 90° relative to the first body part 3 to put the actuator cap 1 into an open condition from a closed condition. Hence, the pairs of stops 26, 27 are arranged at 90° from one another around the annular platform 13. Likewise, the blanking plate 24 is located at 90° to the resilient element 19 defining the fluid outlet 18 for the same reason.

There are pairs of stops 26, 27 in each of the two locations so that the projection 28 comes to rest between them. In each pair, one, 26, of the stops projects upwards further than the other, 27, and this stop 26 provides a back stop preventing further rotational motion of the projection 28 past it. The other stop 27 of the pair does not extend so far upwards as the stop 26 but just far enough to impact a lower edge of the projection 28 to provide a degree of resistance to its motion past it. The stop 26 therefore retains the projection 28 in position between it and the stop 27 until a user provides sufficient rotational force to flex it and the lower edge of the projection 28 to allow the projection 28 to pass it (see FIG. 6). In this way the position of the second body part 2 relative to the first body part 3 at the ends of its travel in either the fully open or closed positions of the actuator button 5 are retained until a user desires otherwise.

A support 29 for the actuator button 5 is also integrally formed with the spray channel arrangement 4 via at least one and preferably two sprues 30 during the moulding of the first body part 3. The support 29 could also comprise four sprues 30, in particular two symmetrical pairs of sprues 30, wherein the pairs may be different from each other, for example with respect to the mechanical strength of the sprues 30. The sprues 30 are severed after assembly of the actuator cap 1 in order that the support 29 and the actuator button 5 can rotate relative to the rest of the first body part 3 and the spray channel arrangement 4. The support 29 comprises a facia 31 for the actuator button 5 which is visible when the actuator button 5 is elevated. In addition, the support 29 comprises an upstanding frame 32 that locates through a complimentarily-shaped slot 33 defined by the flap of the actuator button 5. The frame 32 supports the button 5 and assists in making it rigid. It can be made in any appropriate shape to provide a decorative or eye-catching feature on the button 5. Preferably, the frame 32 is secured to the facia 31 by links 34 defining holes 35 through which pegs 36 integrally formed with the actuator button 5 are fitted. These pegs 36 may be snap-fitted into the holes 35 on assembly of the actuator cap 1 thereby connecting the actuator button 5 positively to the support 29.

Turning now to the second body part 2, this snap fits over the first body part 3 when the actuator cap 1 is assembled. The second body part 2 therefore comprises a cap with an upper surface 37 and skirt 38, which is provided internally with the annular flange 12 adjacent its lower edge 8 and with the projection 28 that interacts with the pairs of stops 26, 27. The skirt 38 is also provided with the outlet 25 that is aligned with the outlet 18 from the spray channel arrangement 4 when the actuator cap 1 is opened.

The upper surface 37 of the second body part 2 mounts the actuator button 5, which comprises a substantially rectangular flap that is integrally formed with the upper surface 37 and joined thereto at one end by at least one and preferably two bridges 39 that form hinges. At the other end of the flap forming the button 5 is the slot 33 in which the frame 32 fits. Between this and the bridges 39 is a slot beneath with are integrally formed the cam profiles 22 and 23 in the form of ramps defined by edge surfaces respectively of two depending, part cylindrical walls 40 and 41 respectively. The cam profiles 22 and 23 are substantially parallel to one another and run at approximately 45° to the horizontal when the actuator cap 1 is upright. However, the cam profile 22 is located at a lower level than the cam profile 23 and is formed by the edge surfaces of a slot 42 in the wall 40 that has an offset lower edge 43 in order to accommodate the shift in position of the cam follower 20 that occurs when the actuator button 5 is opened and closed. In contrast, the cam profile 23 is formed by the lower edge surface of the wall 41. However, the lower end portion 44 of the ramp defining the cam profile 23 is angled with respect to the remainder of the ramp such that it extends substantially horizontally when the actuator cap 1 is upright and normal to the cam follower 21 when the latter is in contact with it. This provides a rest position wherein the cam follower 21 is retained by the cam profile 23 without sliding of the one relative to the other, for example under gravity. This position corresponds to the fully open position of the actuator button 5 and the cam follower 21 can then be used as a lever to exert pressure on and depress the spray channel arrangement 4 when the actuator button 5 is depressed. This dispenses fluid from the container via the spring-loaded valve beneath the vertical channel 16.

Finally, the second body part 2 defines an interior shelf 45 parallel to and adjacent the end of the actuator button opposite to its hinges 39. This shelf 45 provides a rest or stop against which the fascia 31 of the actuator button 5 abuts when the latter is in its closed position. It therefore retains the upper surface of the actuator button 5 flush with the upper surface 37 of the second body part 2 and prevents depression of the actuator button 5 into the body of the actuator cap 1 when the actuator cap 1 is closed.

Figure 8:
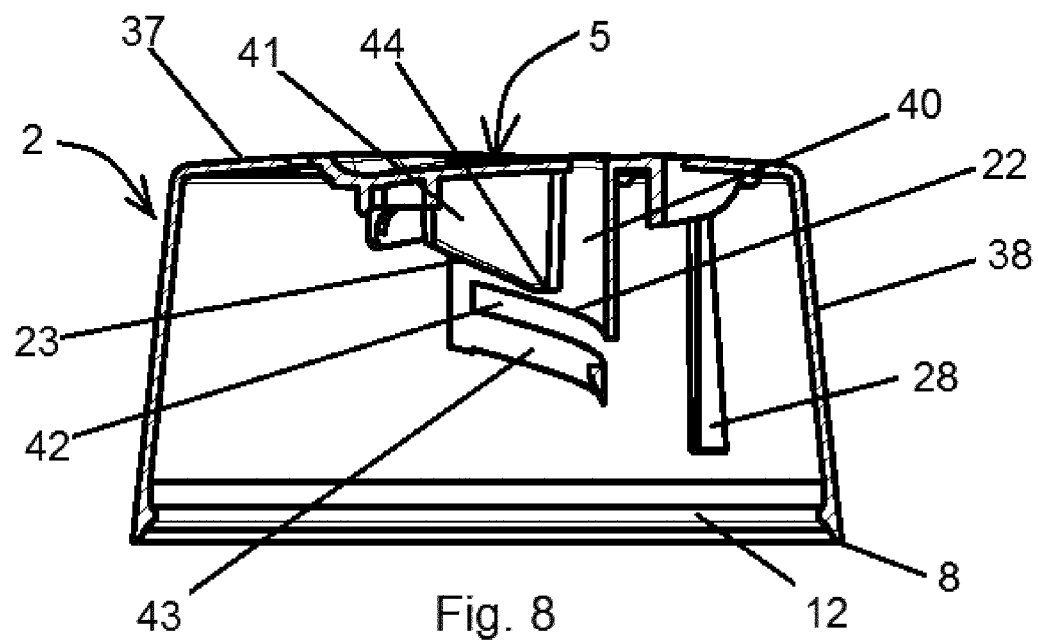
FIG. 8 is a sectional view along the line VIII-VIII in FIG. 7.
Figure 10:
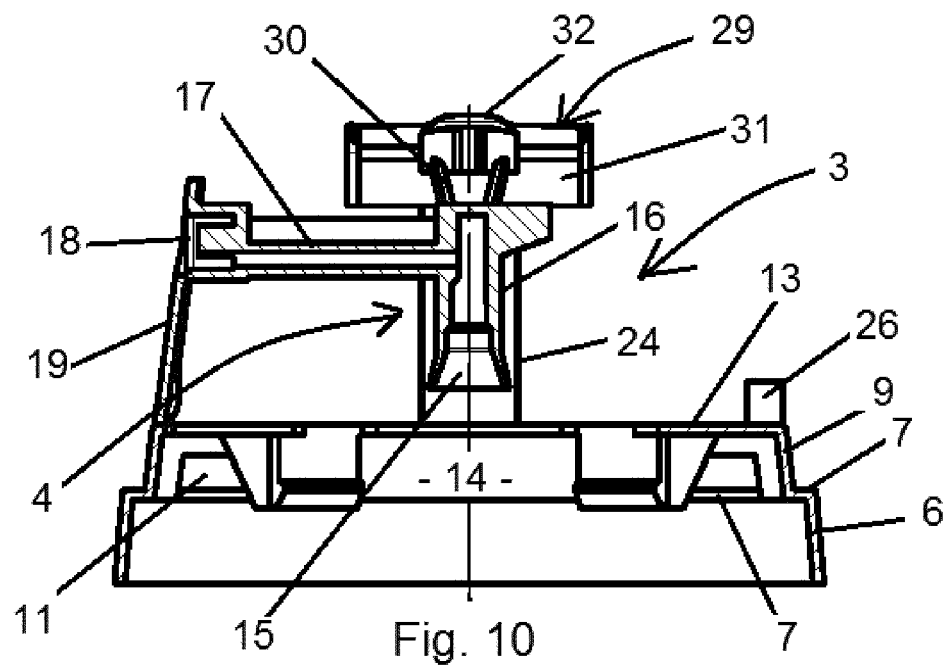
FIG. 10 is a sectional view along the line X-X in FIG. 9
Figure 9:
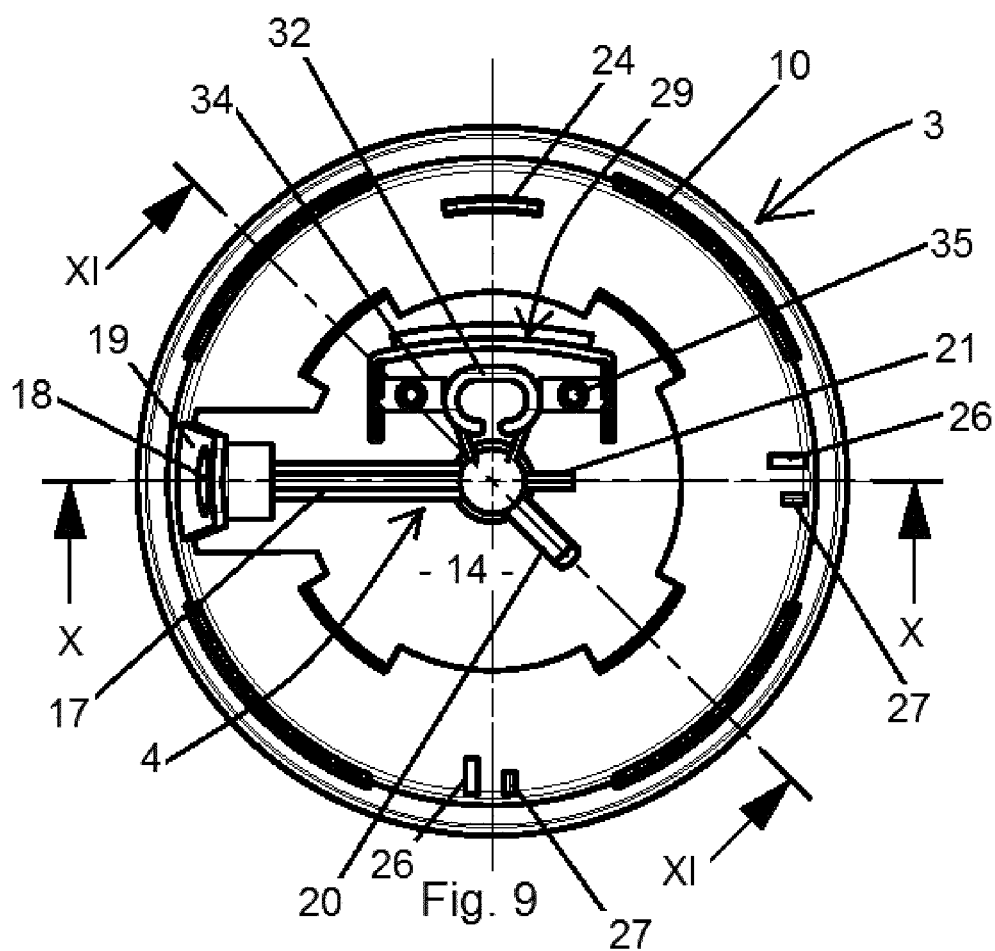
FIG. 9 is a plan view of the first body part of the actuator cap shown in FIG. 5.
Figure 12:
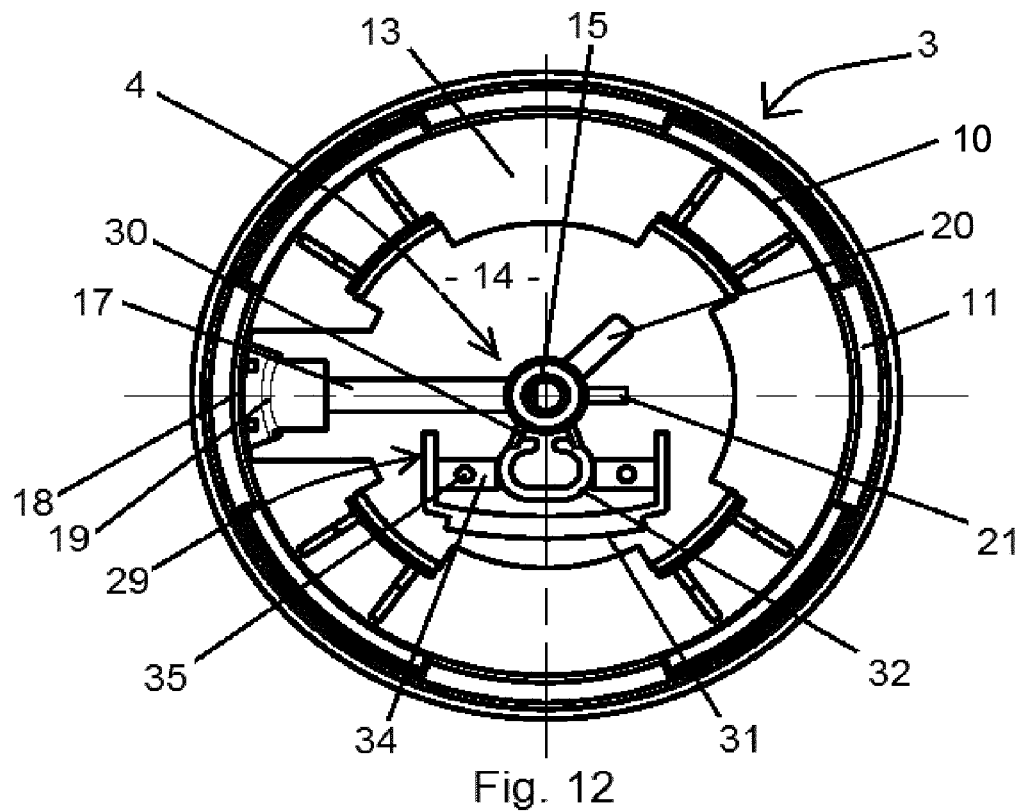
FIG. 12 is a view from below of the first body part of the first embodiment of actuator cap.
Figure 11:
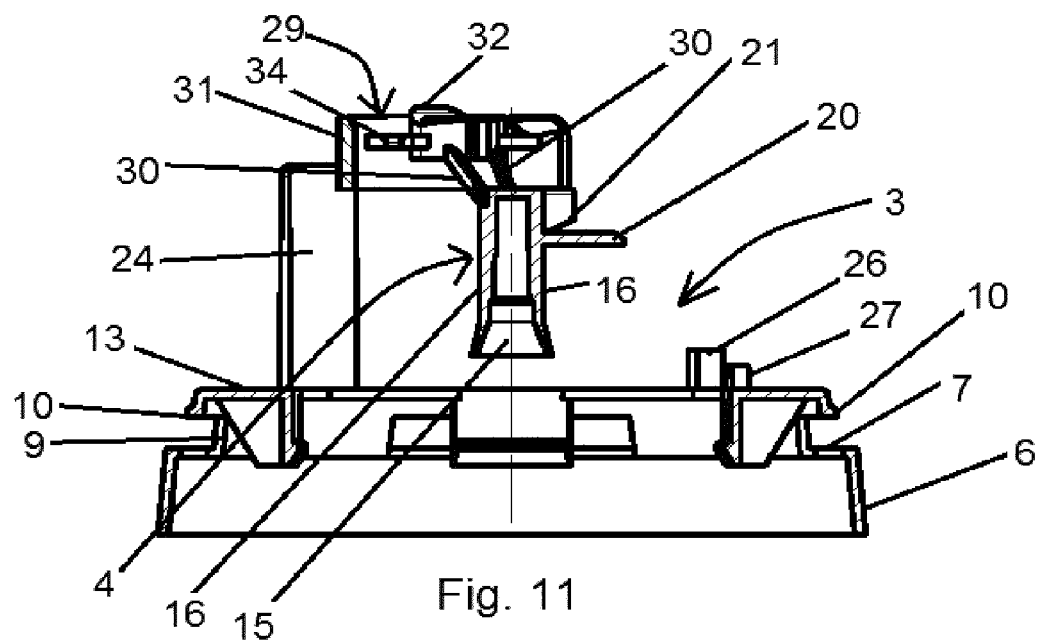
FIG. 11 is a sectional view along the line XI-XI in FIG. 9.
Figure 13:
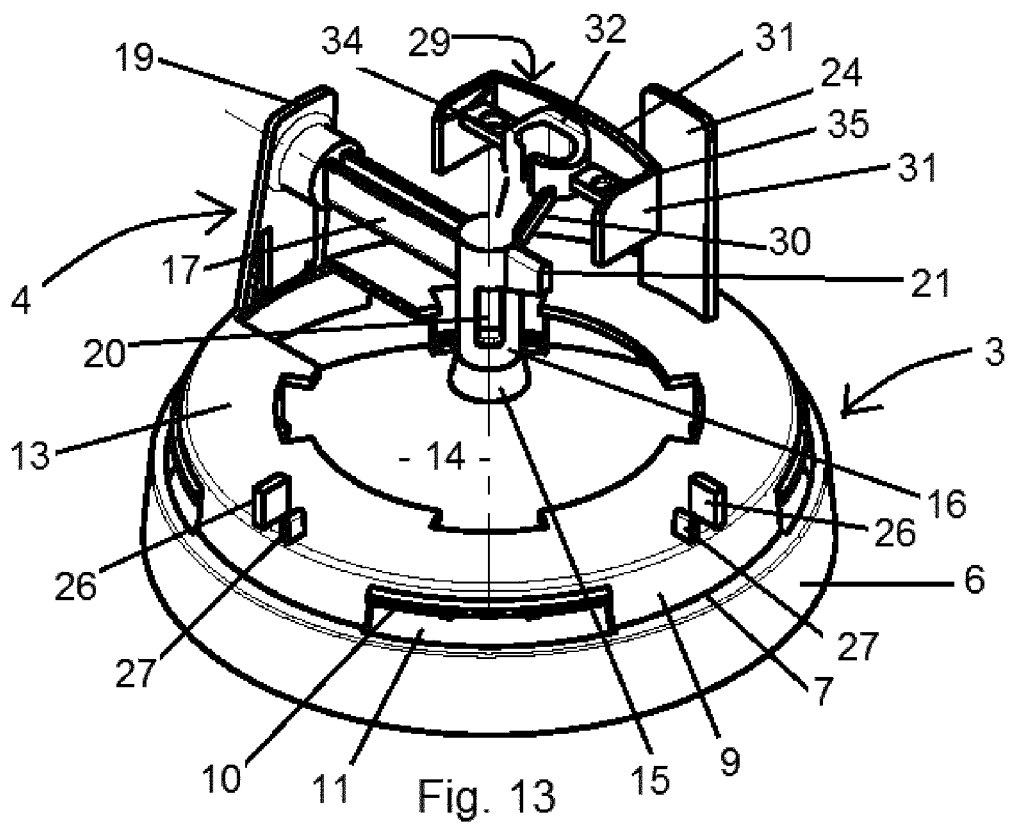
FIGS. 13 and 14 are perspective views of the first body part shown in FIG. 12, FIG. 14 showing the first body part after rotation through 90° with respect to FIG. 13.
Figure 14:
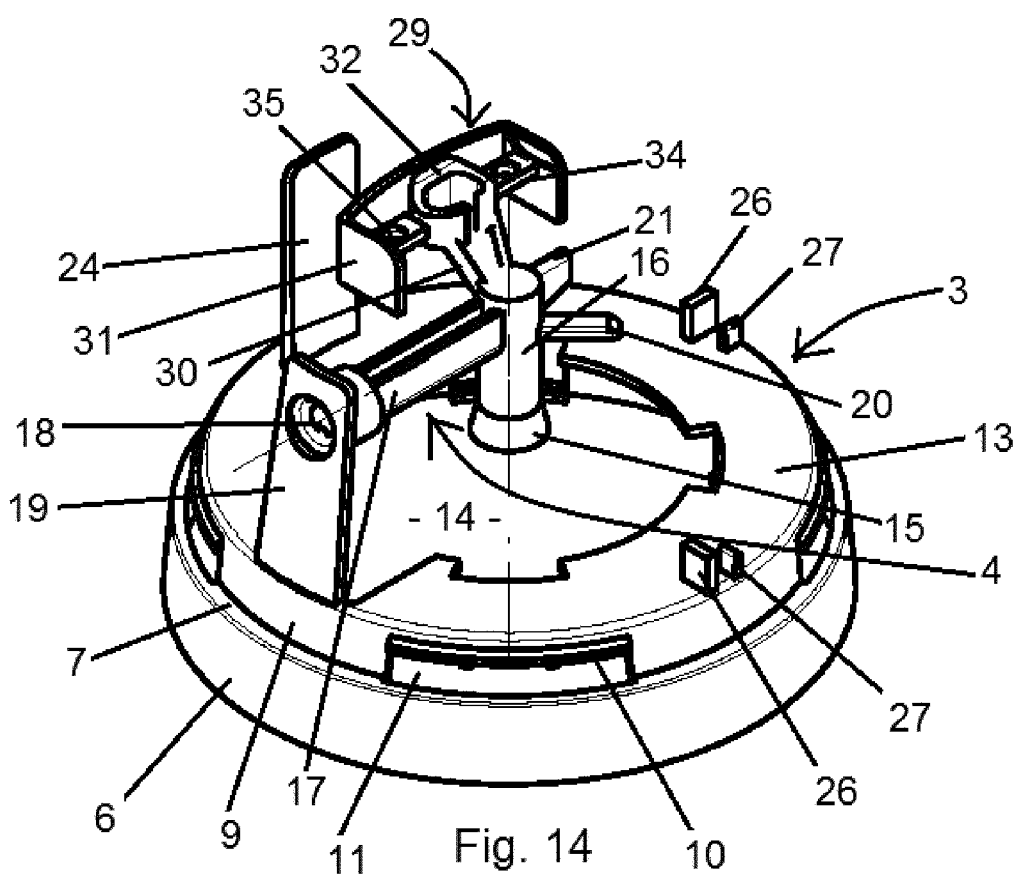
Figure 15:
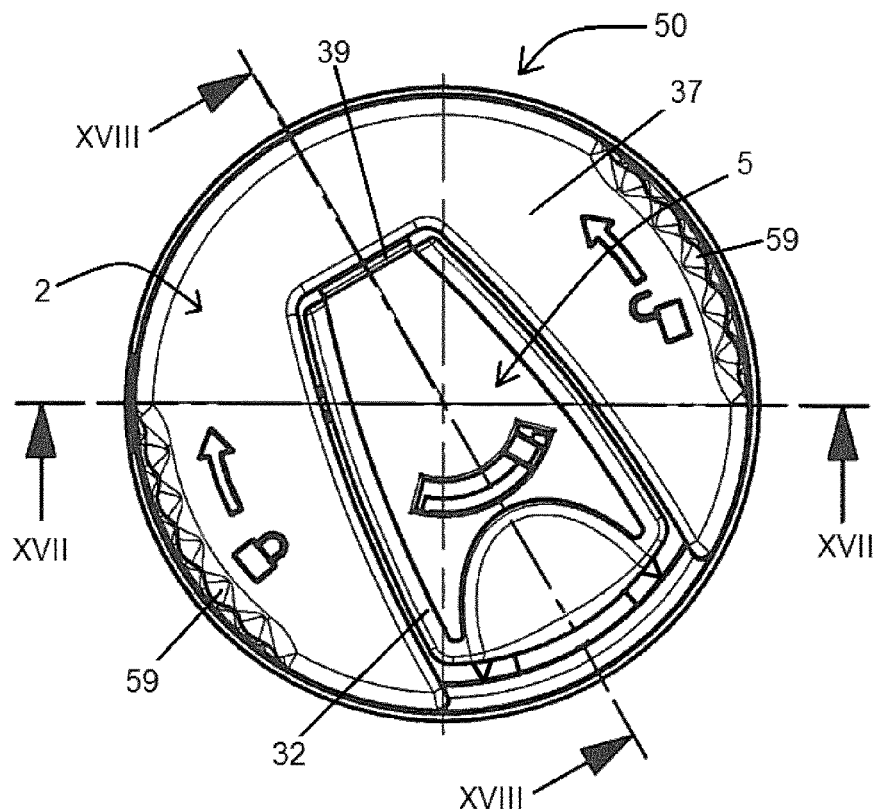
FIG. 15 is a plan view of a second embodiment of actuator cap for a fluid spray dispenser in accordance with the present invention when in a closed condition.

It will be appreciated from the foregoing description that the actuator cap 1 is assembled by snap-fitment of the second body part 2 over the first body part 3, which body parts 2 and 3 have each been integrally moulded as one-piece components in the forms shown in FIG. 8 and FIG. 13 respectively. The second body part 2 needs to be positioned relative to the first body part 3 so that when the actuator button 5 is closed, the blanking plate 24 of the first body part 3 covers the outlet 25 in the second body part 2. The second body part 2 is angled over the first body part 3 prior to its snap fitment thereto in order to locate the cam followers 20 and 21 into a correct position relative to the cam profiles 22 and 23. In particular, the cam follower 20 needs to be inserted into the slot 42 that defines the cam profile 22. Once in position the second body part 2 can be snapped into position so that the annular flange 12 is snap-fitted beneath the flanges 10 and the pegs 36 snap fit into the holes 35 in the actuator button 5. The frame 32 is then correctly located into the slot 33.

Once assembled, the sprues 30 attaching the support 29 for the actuator button 5 to the spray channel arrangement 4 are severed. Thereafter the actuator cap 1 may be appropriately fitted to a container and valve for the fluid to be dispensed and the container filled with the fluid.

In use, when the actuator cap 1 is closed, the actuator button 5 is flush with the surface 37 of the outer cap 2, the blanking plate 24 covers the outlet 25 and the first and second cam followers 20 and 21 are located at the upper ends of the ramps defining the first and second cam profiles 22 and 23 respectively. In order to open the actuator cap 1 the second body part 2 is rotated anticlockwise, when viewed from above, relative to the first body part 3 through 90° so that the projection 28 moves from between one pair of stops 26, 27 to between the other pair of stops 26, 27. During the rotation, the cam followers 20 and 21 move along the cam profiles 22 and 23. In turn, the cam profile 22 exerts pressure on the actuator button 5 via the wall 40 and causes it to rotate about its hinges 39 and adopt an elevated position at its end opposite the hinges 39, thereby raising the fascia 31 above the surface 37 of the second body part 2. At the same time, the cam follower 21 travels along the cam profile 23 and comes to rest under the end portion 44. The outlet 25 is now in line with the outlet 18 in the spray channel arrangement 4 as is the longitudinal axis of the actuator button 5. Depression of the actuator button 5 by finger pressure from a user causes the wall 41 to exert pressure on the cam follower 21 which is thereby also depressed. This then depresses the vertical channel 16 against the bias of the resilient element 19, tilting the channel 17 out of the horizontal and pressing down on the valve against the bias of its own spring-loading so that the valve opens to allow fluid to be dispensed. The fluid passes through the valve, through the channels 16 and 17 and out of the cap 1 through the aligned outlets 18 and 25. Once pressure on the actuator button 5 ceases, the resilient element 19 returns the spray channel arrangement 4 back to its original position, releasing the pressure on the spring-loaded valve thereby allowing it to close. The actuator cap 1 can then be closed by rotation of the second body part 2 relative to the first body part 3 in an opposite direction back to its initial position. This rotation causes the cam follower 20 to move back along the cam profile 22 and thereby pull the open end of the actuator button 5 back into the second body part 2 until it lies flush with the surface 37. At the same time the cam follower 21 is returned to the upper part of the cam profile 23. The blanking plate 24 moves into position covering the outlet 25.

The second embodiment of actuator cap 50, as shown in FIGS. 15 to 19 will now be described in more detail. However, it will be appreciated that many of the features of the cap 50 are the same or similar to those described above with reference to the first embodiment. Hence, the following description concentrates mainly on those features that are different.

Again, the first body part 3 of the actuator cap 1 is adapted to be secured to the dispenser, such as the pressurized fluid container C, by the provision of an annular skirt 6 that is or can be adapted as appropriate to fit over the rim R of an upper opening of the container C In this embodiment, the skirt 6 is of a greater height to that in the first embodiment and defines an interior annular flange 51 near its bottom rim that is used to snap-fit into a complementary channel or groove G provided near the top of the container C In addition, the skirt is also provided with a second, interior annular flange 52 that is wider and adapted to rest on the shoulder or tapering upper portion of the container C to stabilize the first body part 3 and retain it in position. The upper part of the skirt 6 is adapted to be secured to the second body part 2. To this end it is stepped inwards to define a substantially horizontal shoulder 7 on which a lower edge 8 of the second body part 2 sits after assembly of the actuator cap 1 in a similar fashion to the first embodiment. Hence, as before, the outer peripheral surface of the skirt 6 is always visible in the assembled cap 1. Again, adjoining the shoulder is an annular upstand 9 that defines an annular flange 53 or series of flanges defining an annulus over which a complementary interior annular flange 54 snap-fits to secure the two body parts 2 and 3 together. Again, the flanges 53 and 54 permit the two body parts 2 and 3 to be rotated relative to each other. However, the degree to which rotation is permitted is controlled in a similar way to the first embodiment by two pairs of projections 26, 27 that form stops against which an internal projection 28 formed on the second body part 2 abuts at the limit of its rotational travel in its first and second positions. However, whereas in the first embodiment the second body part 2 rotates through 90° relative to the first body part 3 to put the actuator cap 1 into an open condition from a closed condition, in the second embodiment the second body part 2 rotates through only 60° relative to the first body part 3. Otherwise, the pairs of projections 26, 27 and the projection 28 operate as described above.

Another difference between the first and second embodiments is the location and mounting of the spray channel arrangement 4. However, as in the first embodiment the spray channel arrangement 4 comprises two integrally formed channels 16 and 17 that are in fluid communication with one another and that are arranged at right angles, one channel 16 being vertical and the other channel 17 being horizontal with an inlet 15 at the lower end of the vertical channel 16. The vertical channel 16 is again centrally located so that its longitudinal axis coincides with that of the actuator cap 1 and a valve outlet O. The fluid outlet 18 from the spray channel arrangement 4 is also connected to a resilient element 19 on which the spray channel arrangement 4 is integrally mounted thereby enabling the vertical channel 16 to be depressed against the bias of the resilient element 19, tilting the channel 17 slightly out of the horizontal. However, unlike the upright resilient element 19 of the first embodiment, here the element 19 is short and integrally formed with a portion of the skirt 6 adjacent an aperture 55 through which the outlet 18 protrudes. The outlet 18 is not, therefore, covered by a blanking plate when the actuator cap 50 is closed and is therefore visible at all times as shown in FIG. 16. In contrast to the first embodiment, a blanking plate 24 is not necessary for the second embodiment.

The spray channel arrangement 4 also defines two projections that form the first and second cam followers 20 and 21. As before the cam followers 20, 21 travel along first and second cam profiles 22 and 23 respectively that are integrally formed with the actuator button 5. The positioning and use of the cam follower 20, 21 and cam profiles 22 and 23 is as described above for the first embodiment except that the angle between the first and second cam followers 20, 21 is less than 45° owing to the reduced rotation of the second body part 2 relative to the first body part 3 to move between open and closed positions.

The actuator button 5 is also provided with a support 29 that is integrally formed with the spray channel arrangement 4 via at least one and preferably two sprues 30 during the moulding of the first body part 3 as before. The support 29 could also comprise four sprues 30, in particular two symmetrical pairs of sprues 30, wherein the pairs may be different from each other, for example with respect to the mechanical strength, the shape or the position of the sprues 30 with respect to the support 29. In the second embodiment, a first pair of sprues 30 is provided at a central part of the support 29 extending in radial directions with respect to the vertical channel 16, that is similar to the first embodiment. A second pair of sprues 30 is provided at a circumferential part of the support 29 integrally formed with the annular skirt 6, for example with the shape of a radially outward pointing noses. Again, the sprues 30 are severed after assembly of the actuator cap 1 in order that the support 29 and the actuator button 5 can rotate relative to the rest of the first body part 3 and the spray channel arrangement 4. The support 29 of the second embodiment comprises a facia 31 for the actuator button 5 which is visible when the actuator button 5 is elevated. In addition, the support 29 comprises an upstanding frame 32 but in this embodiment the frame 32 surrounds the flap of the actuator button 5 apart from where it is connected to the second body part by an integral hinge 39. The frame 32 is connected to the flap of the actuator button 5 by pegs 56 provided on the underside of the flap that snap-fit into holes 57 provided in stepped down projecting lugs 58 integral with the frame 32. Alternatively the pegs 56 are provided in the frame 32 and snap-fit into holes provided in the flap. As before, the frame 32 supports the button 5 and assists in making it rigid. It can be made in any appropriate shape to provide a decorative or eye-catching feature on the button 5.

Turning now to the second body part 2, this snap fits over the first body part 3 when the actuator cap 1 is assembled as described above and therefore forms a cap for the first body part 3 with an upper surface 37 and skirt 38, which is not as high or tall as that of the first embodiment and is provided with moulded-in, external gripping ridges 59 or similar to facilitate its manual rotation relative to the first body part 3.

As before, the upper surface 37 of the second body part 2 mounts the flap of the actuator button 5, which is integrally formed with the upper surface 37 and joined thereto at one end by a flexible bridge that forms the hinge 39. At the other end of the flap and along its opposing sides is a slot 33 in which the frame 32 fits. Beneath the flap 5 are the integrally formed cam profiles 22 and 23 in the form of ramps, which are similar to those of the first embodiment and will not, therefore, be described again. The direction of motion of the elevation of the actuator button 5 in the first and the second embodiments, respectively, is reversed. That is, the hinge 39 is provided on the opposite side of the second body part 2 with respect to the outlet 18, when the actuator cap 1 is opened. In the first embodiment, the actuator button 5 elevates on the side towards the outlet 18 (see FIG. 5), whereas in the second embodiment, the actuator button 5 elevates on the opposite side (see FIG. 19).

Finally, unlike the first embodiment, in order to retain the upper surface of the actuator button 5 flush with the upper surface 37 of the second body part 2 and to prevent depression of the actuator button 5 into the body of the actuator cap 1 when the actuator cap 1 is closed, the button 5 comprises an internal shelf 61 that projects from the interior of the skirt 6. When the actuator cap 1 is in its closed position the fascia 31 lies adjacent the internal shelf 61. This shelf 61 provides a rest or stop against which the fascia 31 abuts when the actuator cap 1 is in its closed position. However, when the actuator cap 1 is in its open position, the fascia 31 has moved away from the shelf 61 so that the button 5 can be depressed and the fascia 31 pushed downwards into the interior of the first body part 3.

As before, the actuator cap 50 is assembled by snap-fitment of the second body part 2 over the first body part 3, which body parts 2 and 3 have each been integrally moulded as one-piece components in the forms shown in FIGS. 20 to 22 and FIGS. 23 to 25 respectively. The second body part 2 is positioned so that the support 29 lies beneath the actuator and the cam followers 20 and 21 located into a correct position relative to the cam profiles 22 and 23 as described above. Once assembled, the sprues 30 attaching the support 29 for the actuator button 5 to the spray channel arrangement 4 are severed. Thereafter the actuator cap 50 may be appropriately fitted to a container and valve for the fluid to be dispensed and the container filled with the fluid.

In use, when the actuator cap 50 is closed, the actuator button 5 is flush with the surface 37 of the outer cap 2, the first and second cam followers 20 and 21 are located at the upper ends of the ramps defining the first and second cam profiles 22 and 23 respectively. In order to open the actuator cap 1, the second body part 2 is rotated anticlockwise, viewed from above, relative to the first body part 3 through 60° so that the projection 28 moves from between one pair of stops 26, 27 to between the other pair of stops 26, 27. During the rotation, the cam followers 20 and 21 move along the cam profiles 22 and 23 in exactly the same way as described above in order to elevate the end of the actuator button 5, thereby raising the fascia 31 above the surface 37 of the second body part 2. At the same time, the cam follower 21 travels along the cam profile 23 and comes to rest under the end portion 44. The longitudinal axis of the actuator button 5 is now in line with the outlet 18 in the spray channel arrangement 4. Depression of the actuator button 5 by finger pressure from a user causes fluid to be dispensed in exactly the same way as described above. When it is desired to close the actuator cap 50 rotation of the second body part 2 relative to the first body part 3, in a clockwise direction when viewed from above, returns the actuator button 5 back to its initial position.

Hence, it will be appreciated that the present invention provides an actuator cap 1, 50 for a fluid spray dispenser that comprises only two moulded components, the first and second body parts 3 and 2, that are of simple construction relative to the prior art. These body parts 2, 3 are also easily are quickly assembled. This enables the actuator cap 1, 50 to be manufactured economically and efficiently thereby significantly reducing the cost of the finished product.

The invention claimed is:

1. An actuator cap for a fluid spray dispenser comprising
a first body part adapted for connection to a container for a fluid to be dispensed and incorporating a spray channel arrangement; and
a second body part incorporating an actuator button, the second body part being rotatable with respect to the first body part from a first position in which the actuator button is non-elevated into a second position in which the actuator button is elevated and capable of depression to cause depression of a part of the spray channel arrangement;
wherein the actuator button defines a first cam profile along which a first cam follower defined by the first body part travels to cause elevation or retraction of the actuator button when the second body part is rotated; and
the actuator button defines a second cam profile that bears against said part of the spray channel arrangement such that when the actuator button is in an elevated position and depressed the actuator button depresses said second cam profile and in turn depresses said part of the spray channel arrangement relative to the first body part to dispense the fluid from the container when in use;

wherein a support for the actuator button is integrally formed with the spray channel arrangement via at least one sprue that is severed after assembly of the actuator cap.

2. An actuator cap as claimed in claim 1, wherein the first and second body parts are each integrally moulded components that are adapted to be snap-fitted together.

3. An actuator cap as claimed in claim 1, wherein said part of the spray channel arrangement is a second cam follower that travels along the second cam profile when the second body part is rotated relative to the first body part.

4. An actuator cap as claimed in claim 3, wherein an end portion of the second cam profile against which the second cam follower bears when the second body part is in the second position is angled with respect to the remainder of the second cam profile to define a rest position wherein the second cam follower is retained in the rest position by the second cam profile.

5. An actuator cap as claimed in claim 3, wherein the first and second cam followers are defined by projections from the spray channel arrangement.

6. An actuator cap as claimed in claim 1, wherein the spray channel arrangement extends from and is connected to the first body part by a resilient element.

7. An actuator cap as claimed in claim 6, wherein the spray channel arrangement is integrally formed with the first body part via the resilient element.

8. An actuator cap as claimed in claim 1, wherein the spray channel arrangement comprises two integrally formed channels that are in fluid communication with one another and that are arranged at right angles, one channel being vertical and the other channel being horizontal when the cap is upright.

9. An actuator cap as claimed in claim 6, wherein the spray channel arrangement comprises two integrally formed channels that are in fluid communication with one another and that are arranged at right angles, one channel being vertical and the other channel being horizontal when the cap is upright and wherein the spray channel arrangement is a cantilever and, when the actuator button is depressed, the second cam profile that bears against said part of the spray channel arrangement depresses the vertical channel and tilts the horizontal channel against the bias of the resilient element.

10. An actuator cap as claimed in claim 9, wherein a fluid outlet from the spray channel arrangement is defined at one end of the horizontal channel through said resilient element.

11. An actuator cap as claimed in claim 8, wherein a fluid inlet is defined at the lower end of the vertical channel, which has a longitudinal axis that coincides with that of the actuator cap.

12. An actuator cap as claimed in claim 10, wherein the second body part defines an aperture forming a fluid outlet that is aligned with the fluid outlet from the spray channel arrangement when the second body part is in the second position.

13. An actuator cap as claimed in claim 12, wherein the first body part comprises a blanking plate that covers said aperture in the second body part when the second body part is in the first position.

14. An actuator cap as claimed in claim 10, wherein the first body part defines an aperture through which the fluid outlet protrudes.

15. An actuator cap as claimed in claim 1, wherein the actuator button comprises a flap that is integrally formed with the second body part and connected thereto at one end by means of at least one bridge that forms a hinge.

16. An actuator cap as claimed in claim 1, wherein the support for the actuator button is integrally formed with the spray channel arrangement via two sprues that are severed after assembly of the actuator cap.

17. An actuator cap as claimed in claim 1, wherein the support comprises a facia for the actuator button that is visible when the second body part is in the second position.

18. An actuator cap as claimed in claim 1, wherein the support comprises a frame that locates through a complimentarily-shaped slot defined by the flap of the actuator button.

19. An actuator cap as claimed in claim 17, wherein the support comprises a frame that locates through a complimentarily-shaped slot defined by the flap of the actuator button and wherein the frame is connected to the facia by links defining holes through which pegs integrally formed with the actuator button are fitted.

20. An actuator cap as claimed in claim 19, wherein the pegs are snap-fitted into the holes in the links.

21. An actuator cap as claimed in claim 15, wherein a support for the actuator button is integrally formed with the spray channel arrangement via at least one sprue that is severed after assembly of the actuator cap and wherein the support is connected to the flap by pegs provided on the underside of the flap that snap-fit into holes provided in a portion of the frame or the support is connected to the flap by pegs provided on a portion of the frame that snap-fit into holes provided in the flap.

22. An actuator cap as claimed in claim 1, wherein the second body part defines an internal projection that travels between two projecting stops defined by the first body part that limit the rotational movement of the second body part relative to the first body part.

23. An actuator cap as claimed in claim 22, wherein each stop is one of a pair of stops between which the internal projection rests at the end of travel, one stop of each pair being larger than the other.

24. An actuator cap as claimed in claim 23, wherein the smaller stop of each pair extends sufficiently to impact an edge of the internal projection to provide a degree of resistance to rotational motion and thereby retains the projection in position between the smaller stop and the larger stop until a user provides sufficient rotational force to the second body part relative to the first body part to force the projection past the smaller stop.

25. An actuator cap as claimed in claim 1, wherein the second body part and the first body part are made from plastics materials respectively having different colours.

26. An actuator cap as claimed in claim 1, wherein the support for the actuator button is integrally formed with the spray channel arrangement via four sprues that are severed after assembly of the actuator cap.

* * * * *